(12) United States Patent
Kang (10) Patent No.: US 11,119,359 B2
(45) Date of Patent: Sep. 14, 2021

(54) OPTICAL COMPOSITE FILM LAYER, DISPLAY PANEL, AND DISPLAY DEVICE

(71) Applicants: HKC Corporation Limited, Shenzhen (CN); Chongqing HKC Optoelectronics Technology Co., Ltd., Chongqing (CN)

(72) Inventor: Chih Tsung Kang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/044,201

(22) PCT Filed: Nov. 30, 2018

(86) PCT No.: PCT/CN2018/118486
§ 371 (c)(1),
(2) Date: Sep. 30, 2020

(87) PCT Pub. No.: WO2020/087634
PCT Pub. Date: May 7, 2020

(65) Prior Publication Data
US 2021/0096411 A1  Apr. 1, 2021

(30) Foreign Application Priority Data
Oct. 30, 2018  (CN) .......................... 201811277544.7

(51) Int. Cl.
*G02F 1/133* (2006.01)
*G02F 1/13363* (2006.01)
(Continued)

(52) U.S. Cl.
CPC .... *G02F 1/13363* (2013.01); *G02F 1/133504* (2013.01); *G02F 1/13471* (2013.01)

(58) Field of Classification Search
CPC .................................................. G02F 1/13363
See application file for complete search history.

(56) References Cited

U.S. PATENT DOCUMENTS

| 2006/0050387 A1 | 3/2006 | Arakawa et al. |
| 2006/0187395 A1 | 8/2006 | Yang et al. |
| | (Continued) | |

FOREIGN PATENT DOCUMENTS

| CN | 101055366 A | 10/2007 |
| CN | 101088034 A | 12/2007 |
| | (Continued) | |

OTHER PUBLICATIONS

International Search Report dated Jul. 31, 2019 issued in corresponding International Application No. PCT/CN2018/118486, filed Nov. 30, 2018, 3 pages.
(Continued)

*Primary Examiner* — Sang V Nguyen
(74) *Attorney, Agent, or Firm* — Christensen O'Connor Johnson Kindness PLLC (57) ABSTRACT

An optical composite film layer, comprising a first uniaxial optical film layer, a second uniaxial optical film layer, and a first grating film layer. The first uniaxial optical film layer comprises a platy portion and multiple refraction portions disposed on one side of the platy portion, and the multiple refraction portions are selected from one of cambered columns or quadrangular columns; the second uniaxial optical film layer is laminated on one side, close to the refraction portions, of the platy portion, the multiple refraction portions are received in the second uniaxial optical film layer, and the extraordinary light refractive index of the first
(Continued)

uniaxial optical film layer is greater than the ordinary light refractive index of the second uniaxial optical film layer; and the first grating film layer is disposed on one side, far away from the first uniaxial optical film layer, of the second uniaxial optical film layer.

20 Claims, 8 Drawing Sheets

(51) Int. Cl.
  *G02F 1/1335* (2006.01)
  *G02F 1/1347* (2006.01)

(56) References Cited

U.S. PATENT DOCUMENTS

| | | | |
|---|---|---|---|
| 2007/0296896 | A1 | 12/2007 | Hong et al. |
| 2012/0069272 | A1* | 3/2012 | Sugita .................. G02B 5/0257 349/64 |
| 2013/0088785 | A1 | 4/2013 | Yamamoto |
| 2014/0353618 | A1 | 12/2014 | Shim et al. |
| 2015/0043221 | A1* | 2/2015 | Lee ....................... G02B 5/0273 362/311.03 |
| 2016/0252665 | A1* | 9/2016 | Lee ........................ G02B 5/305 359/489.07 |
| 2017/0038519 | A1* | 2/2017 | Kim .................. G02F 1/133528 |
| 2018/0210573 | A1* | 7/2018 | Hashida .................. G06F 3/042 |
| 2019/0137676 | A1* | 5/2019 | Nam ........................ C08L 83/08 |

FOREIGN PATENT DOCUMENTS

| | | |
|---|---|---|
| CN | 101287144 A | 10/2008 |
| CN | 101435890 A | 5/2009 |
| CN | 101568859 A | 10/2009 |
| CN | 101573643 A | 11/2009 |
| CN | 101861544 A | 10/2010 |
| CN | 102411231 A | 4/2012 |
| CN | 103487987 A | 1/2014 |
| CN | 103513465 A | 1/2014 |
| CN | 104345361 A | 2/2015 |
| CN | 106292049 B | 1/2017 |
| CN | 106468842 A | 3/2017 |
| CN | 106773446 A | 5/2017 |
| CN | 107111189 A | 8/2017 |

OTHER PUBLICATIONS

Notice of Reason for Rejection dated Oct. 12, 2019, issued in Chinese Application No. 201811278704.X, filed Oct. 30, 2018, 8 pages.
Notice of Reason for Rejection dated Aug. 21, 2019, issued in Chinese Application No. 201811277528.8, filed Oct. 30, 2018, 6 pages.
Notice of Reason for Rejection dated Oct. 12, 2019, issued in Chinese Application No. 201811277530.5, filed Oct. 30, 2018, 12 pages.
Notice of Reason for Rejection dated Jul. 29, 2019, issued in Chinese Application No. 201811277534.3, filed Oct. 30, 2018, 6 pages.
Notice of Reason for Rejection dated Jul. 29, 2019, issued in Chinese Application No. 201811277544.7, filed Oct. 30, 2018, 6 pages.
Notice of Reason for Rejection dated Aug. 2, 2019, issued in Chinese Application No. 201811278642.2, filed Oct. 30, 2018, 8 pages.
Notice of Reason for Rejection dated Jul. 29, 2019, issued in Chinese Application No. 201811278643.7, filed Oct. 30, 2018, 6 pages.
Notice of Reason for Rejection dated Oct. 12, 2019, issued in Chinese Application No. 201811278705.4, filed Oct. 30, 2018, 8 pages.

* cited by examiner

OPTICAL COMPOSITE FILM LAYER, DISPLAY PANEL, AND DISPLAY DEVICE

TECHNICAL FIELD

The present disclosure relates to the field of display technology, and more particularly relates to an optical composite film layer, a display panel and a display device.

BACKGROUND

An exemplary large-size LCD (Liquid Crystal Display) panel includes a VA (Vertical Alignment) liquid crystal panel, IPS (In-Plane Switching) liquid crystal panel, and the like. The VA liquid crystal panel has advantages of higher production efficiency and low manufacturing costs than IPS liquid crystal panels do, however, optical property of the VA liquid crystal panel is obviously defective than that of the IPS liquid crystal panel, and in particular, the large-size panel requires a large view angle to be present in commercial application, in VA liquid crystal panel, a brightness in a large view angle rapidly saturates with a voltage, which leads to the serious deterioration of image quality and color shift, compared to the brightness of a square view angle, causing a problem of color shift.

In addition, a structure of the exemplary LCD display panel is generally a laminate structure, that is, a polarizing plate is attached to an upper and lower layers of the liquid crystal, but the current polarizing plate has a single layer thickness of about 200 μm, and both the thickness of the upper and lower polarizing plates are added to be a total of 400 μm, making the liquid crystal display panel thick.

SUMMARY

The present disclosure provides an optical composite film layer capable of alleviating color shift in large view angle and making the thickness of the display panel thinner.

In addition, the present disclosure further provides a display panel and a display device.

An optical composite film layer includes:

a first uniaxial optical film layer including a plate-shaped portion and a plurality of refractive portions disposed on one side of the plate-shaped portion, the plurality of refractive portions being one of an arc-shaped column and a quadrangular prism; each of the refractive portions has a plurality of side surfaces when the refractive portions are arc-shaped columns, one of the side surfaces being an arc-shaped convex surface, and the side surface of the refractive portion away from the arc-shaped convex surface being in contact with the plate-shaped portion; when the refractive portions are the quadrangular prisms, one side surface of each of the refractive portion is in contact with the plate-shaped portion;

a second uniaxial optical film layer laminated on a side of the plate-shaped portion near the refractive portion, the refractive portions being accommodated in the second uniaxial optical film layer, an extraordinary light refractive index of the first uniaxial optical film layer is greater than an ordinary optical refractive index of the second uniaxial optical film layer;

a first grating film layer disposed on a side of the second uniaxial optical film layer away from the first uniaxial optical film layer.

In an embodiment, the optical composite film layer, wherein the first uniaxial optical film layer has an extraordinary light refractive index of 1.0 to 2.5.

In an embodiment, the optical composite film layer, wherein the second uniaxial optical film layer has an ordinary light refractive index of 1.0 to 2.5.

In an embodiment, the optical composite film layer, wherein a difference between the extraordinary light refractive index of the first uniaxial optical film layer and the ordinary optical refractive index of the second uniaxial optical film layer is 0.01 to 2.

In an embodiment, the optical composite film layer, wherein the plurality of refractive portions are arc-shaped columns, the refractive portions are arranged along a straight line, extending directions of each of the refractive portions are parallel, and two adjacent refractive portions are in contact or spaced apart.

In an embodiment, the optical composite film layer, wherein the arc-shaped convex surface is a curved surface disposed with a circular arc line moving along the extending direction of the refractive portion.

In an embodiment, the optical composite film layer, wherein the refractive portions are arc-faced columns, the refractive portions are arranged in a two-dimensional matrix, and two adjacent refractive portions are spaced apart.

In an embodiment, the optical composite film layer, wherein the refractive portions are quadrangular prisms, the refractive portions are arranged along a straight line, extending directions of each of the refractive portions are parallel, and two adjacent refractive portions are spaced apart.

In an embodiment, the optical composite film layer, wherein the refractive portions are quadrangular prisms, the refractive portions are arranged in a two-dimensional matrix, and two adjacent refractive portions are spaced apart.

In an embodiment, the optical composite film layer, wherein a material of the first uniaxial optical film layer is a liquid crystal molecular material of nematic phase.

In an embodiment, the optical composite film layer, wherein the material of the second uniaxial optical film layer is a discotic liquid crystal molecular material.

In an embodiment, the optical composite film layer, wherein the first grating film layer comprises a transparent substrate and a plurality of strip-shaped metal layers disposed on the transparent substrate, the metal layers being spaced apart and arranged in parallel.

In an embodiment, the optical composite film layer, wherein a width of the metal layer is from 50 nm to 150 nm, and a thickness of the metal layer is from 100 nm to 200 nm, and a spacing between two adjacent metal layers is 100 nm to 200 nm.

A display panel includes the optical composite film layer, a first glass film layer, a first indium tin oxide film layer, a liquid crystal layer, a second indium tin oxide film layer, a second grating film layer, a second glass film layer and a photoresist layer, wherein the first grating film layer of the optical composite film layer and the first glass film layer, the first indium tin oxide film layer, the liquid crystal layer, the second indium tin oxide film layer, the second grating film layer, and the second glass film layer are sequentially laminated, and the photoresist layer is laminated between the second grating film layer and the second glass film layer, or the photoresist layer is laminated between the first glass film layer and the first indium tin oxide film layer.

A display device includes a backlight and the above display panel, the backlight being located on one side of the display panel.

Details of one or more embodiments of the present disclosure are set forth in following figures and descriptions.

Other features, objects and advantages of the present disclosure will become apparent from the specification, drawings, and claims.

DETAILED DESCRIPTION OF PREFERRED EMBODIMENTS

The present disclosure provides an optical composite film layer, a display panel and a display device, which are described in further detail below for the purpose, technical scheme and effect of the present disclosure. It should be understood that the specific embodiments described herein are merely intended to explain the present disclosure and are not intended to limit it.

Figure 1:
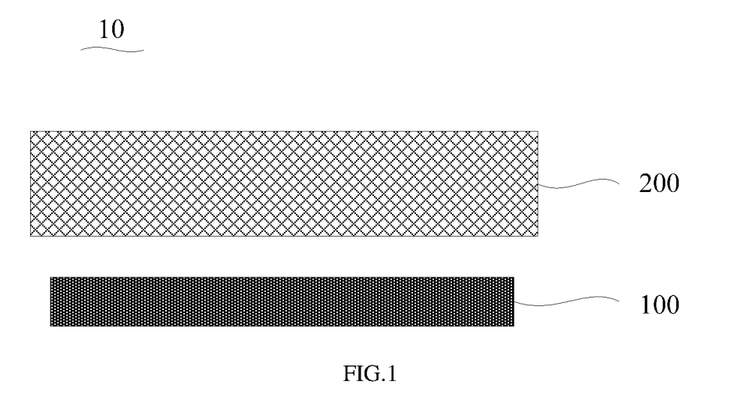
FIG. 1 is a structural diagram of a display device in accordance with an embodiment of the present disclosure.

Referring to FIG. 1, a display device 10 according to an embodiment includes a backlight 100 and a display panel 200.

The backlight 100 is a collimate light emitting backlight source, so that the energy of the light is concentrated on and output at the front view angle.

Figure 2:
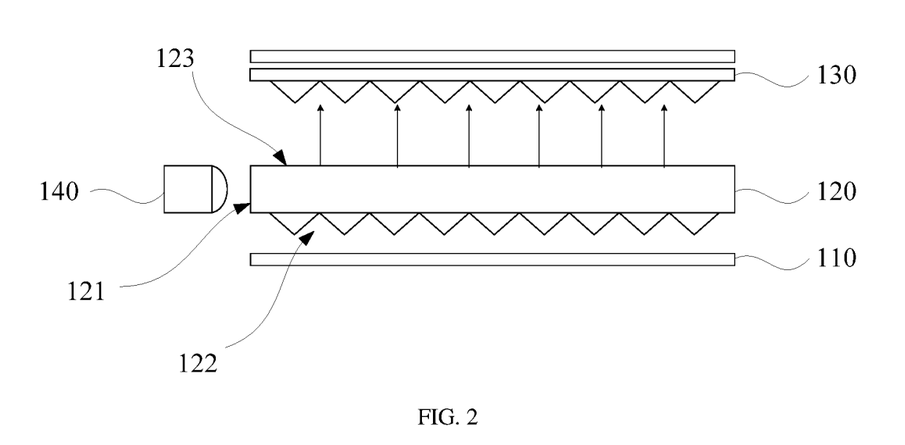
FIG. 2 is a structural diagram of a backlight of a display device in accordance with an embodiment of the present disclosure.

Further referring to FIG. 2, in particular, the backlight 100 includes a reflective sheet 110, a light guide plate 120, a prism film 130, and a light source 140 of a light emitting diode (LED). The reflective sheet 110 is sequentially laminated with the light guide plate 120 and the prism film 130. The light guide plate 120 has an incident surface 121, and the LED light source 140 is disposed opposite to the incident surface 121. The light guide plate 120 defines a strip-shaped first groove 122 on a side near the reflective sheet 110. The first groove 122 has a V-shaped cross section, and the extending direction of the first groove 122 is perpendicular to the light emitting direction of the LED light source 140. The light guide plate 120 defines a strip-shaped second groove 123 on a side near the prism film 130. The second groove 123 has a V-shaped cross section, and the extending direction of the second groove 123 is parallel to the light emitting direction of the LED light source 140. Optionally, a prism side of the prism film 130 is laminated on the light guide plate 120.

Figure 3:
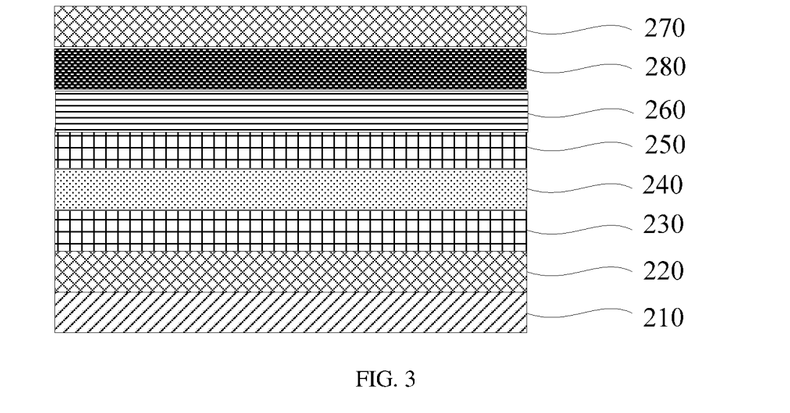
FIG. 3 is a structural diagram of a display panel of a display device in accordance with an embodiment of the present disclosure.

Further referring to FIG. 3, the display panel 200 includes an optical composite film layer 210, a first glass film layer 220, a first indium tin oxide (ITO) film layer 230, a liquid crystal layer 240, a second indium tin oxide film layer 250, a second grating film layer 260, a second glass film layer 270, and a photoresist layer 280.

Figure 4:
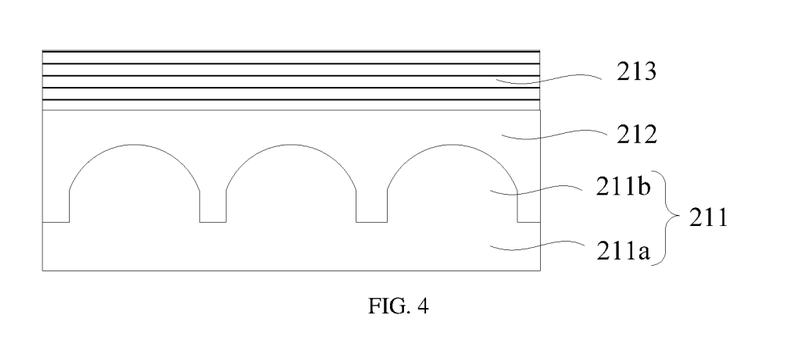
FIG. 4 is a structural diagram of an optical composite film layer of a display panel shown in FIG. 3.

Further referring to FIG. 4, the optical composite film layer 210 includes a first uniaxial optical film layer 211, a second uniaxial optical film layer 212, and a first grating film layer 213.

The first uniaxial optical film layer 211 has optical anisotropy, and a birefringence phenomenon occurs when the light passes through the first uniaxial optical film layer 210. The light ray entering the first uniaxial optical film layer 211 can be equivalent to two light rays of which the polarization directions are perpendicular to each other, namely, the light ray perpendicular to the optical axis of the liquid crystal of the first uniaxial optical film layer 211, called ordinary light, or O light for short; and the light ray parallel to the liquid crystal optical axis of the first uniaxial optical film layer 211, called extraordinary light, or E light for short. Optionally, the extraordinary light refractive index ($ne_1$) is an equivalent refractive index in which the optical axis of the first uniaxial optical film layer 211 is parallel to the light polarization direction; the ordinary light refractive index ($no_1$) is an equivalent refractive index in which the optical axis of the first uniaxial optical film layer 211 is perpendicular to the light polarization direction. The extraordinary light refractive index of the first uniaxial optical film layer 211 is larger than the ordinary light refractive index of the first uniaxial optical film layer 211, i.e., $ne_1 > no_1$.

In an embodiment, an XYZ three-dimensional coordinate system is constructed, $nx_1$ being the refractive index of the first uniaxial optical film layer 211 in the X direction, $ny_1$ being the refractive index of the first uniaxial optical film layer 211 in the Y direction, $nz_1$ being the refractive index of the first uniaxial optical film layer 211 in the Z direction, and the Z direction is the extending direction of the thickness of the first uniaxial optical film layer 211, and the extending direction of the thickness is perpendicular to the light emitting surface of the first uniaxial optical film layer 211. $ne_1=nx_1>no_1=ny_1$ or $ne_1=ny_1>no1=nx_1$, $no_1=nz_1$. Specifically, the material of the first uniaxial optical film layer 211 is a liquid crystal molecular material of nematic phase.

Optionally, the extraordinary light refractive index ($ne_1$) of the first uniaxial optical film layer 211 is 1.0 to 2.5.

Specifically, the first uniaxial optical film layer 211 includes a plate-shaped portion 211a and a refractive portion 211b.

The plate-shaped portion 211a has a transparent flat plate structure.

There is a plurality of refractive portions 211b, and the refractive portions 211b are provided on one side of the plate-shaped portion 211a. Further referring to FIG. 5, specifically, the refractive portions 211b are one of an arc-shaped column and a quadrangular prism.

When the refractive portions 211b are arc-shaped column, the refractive portion 211b has a plurality of side surfaces, one of which is an arc-shaped convex surface, and a side surface away from the arc-shaped convex surface is in contact with the plate-shaped portion 211a. Specifically, the arc-shaped convex surface is a curved surface in which an arc is moved in the extending direction of the refractive portion 211b. More specifically, the arc is a circular arc.

Optionally, the refractive portions 211b are arranged along a straight line, and the extending directions of the refractive portions 211b are parallel, and two adjacent refractive portions 211b are in contact or spaced apart.

Figure 6:
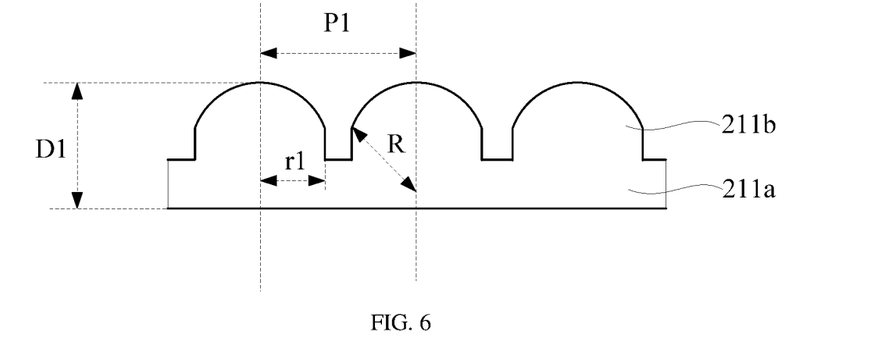
FIG. 6 is a structural diagram of a first uniaxial optical film layer of an optical composite film layer shown in FIG. 4.

Specifically, further referring to FIG. 6, the refractive portion 211b has four side surfaces parallel to the two side surfaces connected to the arc convex surface, and the arc of the refractive portion 211b is a circular arc, the chord corresponding to the arc of the refractive portion 211b is parallel to the bottom surface near the plate-shaped portion 211a. The distance between the midpoint of the arc of the refractive portion 211b and one of the two side surfaces is r1, and the distance between the midpoint of the arc of the adjacent two refractive portions 211b is P1, $P1 \geq 2r1$. When $P1>2r1$, the two adjacent refractive portions 211b are spaced apart; when $P1=2r1$, the two adjacent refractive portions 211b are disposed in close contact with each other. More specifically, $P1 \leq 10$ μm ensures that at least one curved convex surface in the sub-pixel refracts light from the light-dense medium toward the light-repellent medium, and distributes light-type energy of the front view angle to a large view angle.

R is the radius of the circle in which the arc is located, D1 is the maximum thickness of the first uniaxial optical film layer 211, $R \leq D1$. The larger the curvature of the arc, the larger the range in which the front view angle can distribute the large view angle energy.

When the refractive portions 211b are curved columns, the refractive portions 211b are not limited to being arranged along the straight line, the refractive portions 211b may be arranged in a two-dimensional matrix, and two adjacent refractive portions 211b are spaced apart, in order to more efficiently distribute the light energy of the front view angle to the two-dimensional direction, so that the whole view angle is more uniform.

Figure 5:
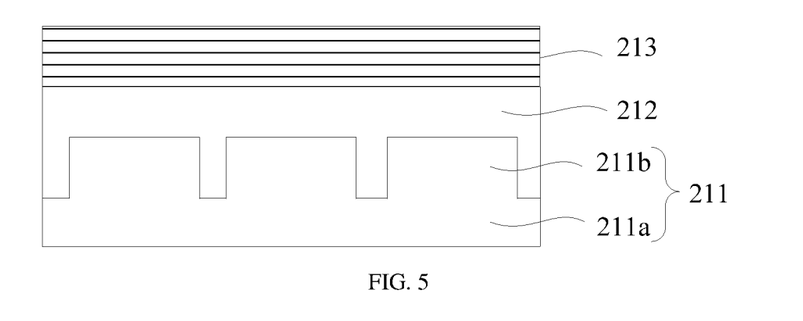
FIG. 5 is a structural diagram of an optical composite film layer of a display panel shown in FIG. 3 in accordance with another embodiment of the present disclosure.

When refractive portions 211b are quadrangular prisms, one side surface of the refractive portion 211b is in contact with the plate-shaped portion 211a.

Optionally, the refractive portions 211b are arranged along a straight line, and the extending directions of the refractive portions 211b are parallel, and two adjacent refractive portions 211b are spaced apart.

Figure 7:
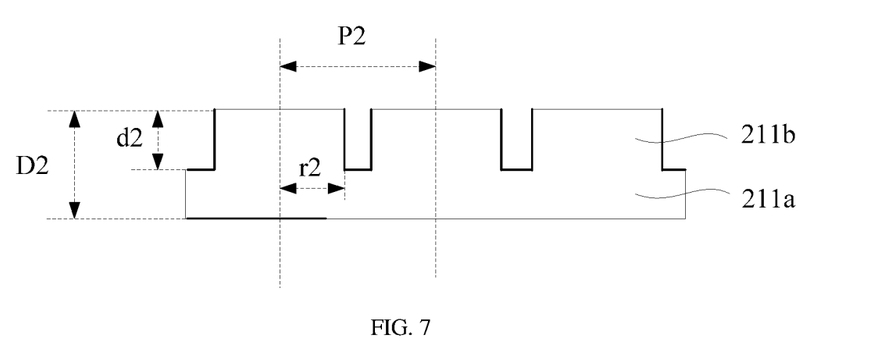
FIG. 7 is a structural diagram of a first uniaxial optical film layer of an optical composite film layer shown in FIG. 5.

Specifically, further referring to FIG. 7, the refractive portions 211b are regular quadrangular prisms, and a half of the width of the side surface of the refractive portion 211b near the plate-shaped portion 211a is r2, and the distance between the center of the side surface of the adjacent two prism portions close to the plate-shaped portion 211a is P2, $P>2r$. Optionally, $P1 \leq 10$ μm ensures that at least one curved convex surface in the sub-pixel refracts light from the light-dense medium toward the light-repellent medium, and distributes the light-type energy of the front view angle to the large view angle. The thickness of the refractive portion 211b is d2, the thickness of the first uniaxial optical film layer 211 is D2, d2 is not 0, and $d2 \leq D2$.

Figure 8:
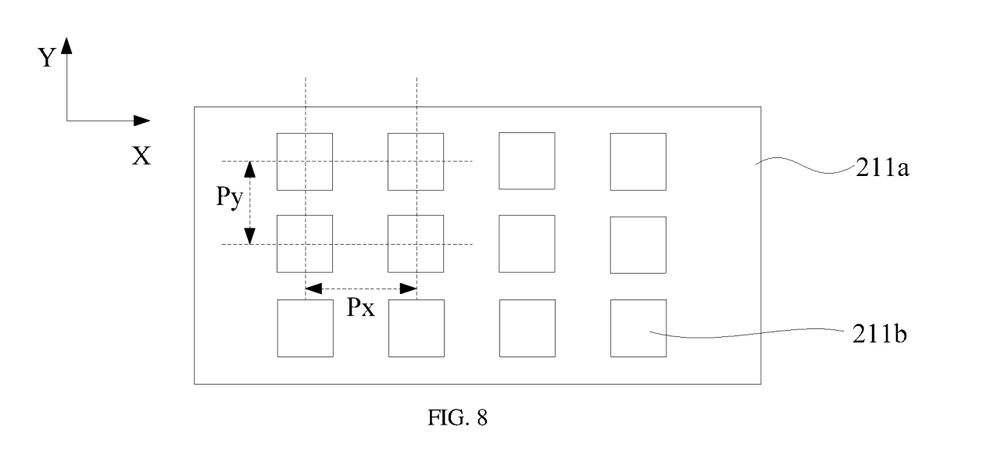
FIG. 8 is a structural diagram of a first uniaxial optical film layer of an optical composite film layer shown in FIG. 5 in accordance with another embodiment of the present disclosure.

Further referring to FIG. 8, when the refractive portions 211b are regular quadrangular prisms, the refractive portions 211b are not limited to being arranged along the straight line, the refractive portions 211b may also be arranged in the two-dimensional matrix, and the two adjacent refractive portions 211b are spaced apart to more effectively distribute the light energy of the front view angle to the two-dimensional direction, so that the viewing at a full view angle is more uniform.

Figure 9:
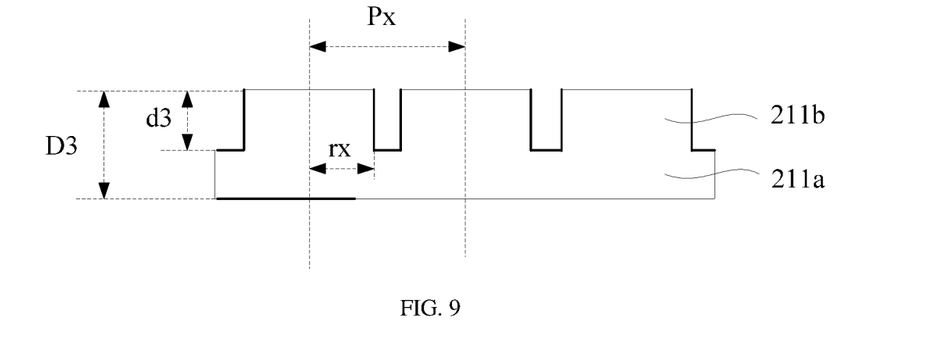
FIG. 9 is a structural diagram of a first uniaxial optical film layer shown in FIG. 8 from another angle.
Figure 10:
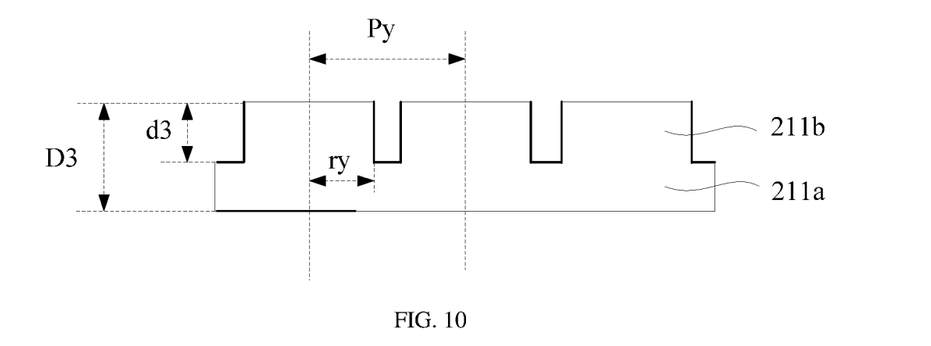
FIG. 10 is a structural diagram of a first uniaxial optical film layer shown in FIG. 8 from another angle.

Referring to FIG. 9 and FIG. 10, specifically, the refractive portions 211b are rectangular prisms, and half of the width of the side surface of the refractive portion 211b near the plate-shaped portion 211a in the X direction is rx, half of the width of the side surface of the refractive portion 211b near the plate-shaped portion 211a in the Y direction is ry, and the distance between two adjacent prism portions in the X direction near the center of the side surface of the plate-shaped portion 211a is Px, the distance in the Y direction of the center of the adjacent two prism portions near the side surface of the plate-shaped portion 211a is Py, $Px=Py$, $Px>2rx$, $Py>2ry$. Optionally, $Px \leq 10$ μm and $Py \leq 10$ μm ensure that at least one curved convex surface in the sub-pixel refracting light from the light-dense medium toward the light-repellent medium, and the light-type energy of the front view angle is distributed to a large view angle. The thickness of the refractive portion 211b is d3, the thickness of the first uniaxial optical film layer 211 is D3, d3 is not 0, and $d3 \leq D3$. It should be noted that Px is not limited to Py, and Px may be larger or smaller than Py.

The second uniaxial optical film layer 212 is laminated on the side of the plate-shaped portion 211a near the refractive portion 211b, and the plurality of refractive portions 211b are accommodated in the second uniaxial optical film layer 212. The second uniaxial optical film layer 212 has anisotropy. Specifically, the material of the second uniaxial optical film layer 212 is a discotic liquid crystal molecular material. More specifically, the material of the second uniaxial optical film layer 212 is a negative-type discotic liquid crystal molecular material.

Optionally, the second uniaxial optical film layer 212 has optical isotropy in a direction parallel to a light exit surface, the ordinary light refractive index in the direction parallel to the light exit surface being $no_2$, the extraordinary light refractive index in the direction perpendicular to the light exit surface being $ne_2$.

In an embodiment, the XYZ three-dimensional coordinate system is constructed, $nx_2$ being the refractive index of the second uniaxial optical film layer 212 in the X direction, $ny_2$ being the refractive index of the second uniaxial optical film layer 212 in the Y direction; the X direction and the Y direction are parallel to the light exit surface of the second uniaxial optical film layer 212, $nz_2$ is the refractive index of the second uniaxial optical film layer 212 in the Z direction, and the Z direction is the extending direction of the thickness of the second uniaxial optical film layer 212, the extending direction of the thickness is perpendicular to the light emitting surface of the second uniaxial optical film layer 212, where $no_2=nx_2=ny_2$, $ne_2=nz_2$.

Optionally, the ordinary light refractive index ($no_2$) of the second uniaxial optical film layer 212 is 1.0 to 2.5.

In an embodiment, the extraordinary light refractive index ($ne_1$) of the first uniaxial optical film layer 211 is greater than the ordinary light refractive index ($no_2$) of the second uniaxial optical film layer 212. Specifically, the difference between the extraordinary light refractive index ($ne_1$) of the first uniaxial optical film layer 211 and the ordinary light refractive index ($no_2$) of the second uniaxial optical film layer 212 is 0.01 to 2. The larger the difference between the extraordinary light refractive index ($ne_1$) of the first uniaxial optical film layer 211 and the ordinary light refractive index ($no_2$) of the second uniaxial optical film layer 212, the more easily a front light energy is distributed to a large view angle.

The first grating film layer 213 is provided on a side of the second uniaxial optical film layer 212 away from the first uniaxial optical film layer 211. Optionally, the first grating film layer 213 is laminated on the surface of the second uniaxial optical film layer 212 on the side away from the first uniaxial optical film layer 211. The first grating film layer 213, instead of the polarizing plate, can change natural light into polarized light, such that the thickness of the display panel 200 can be reduced. The thickness of the first grating film layer 213 is generally less than 20 μm. It can be seen that the thickness of the first grating film layer 213 is much smaller than that of the polarizing plate.

Figure 11:
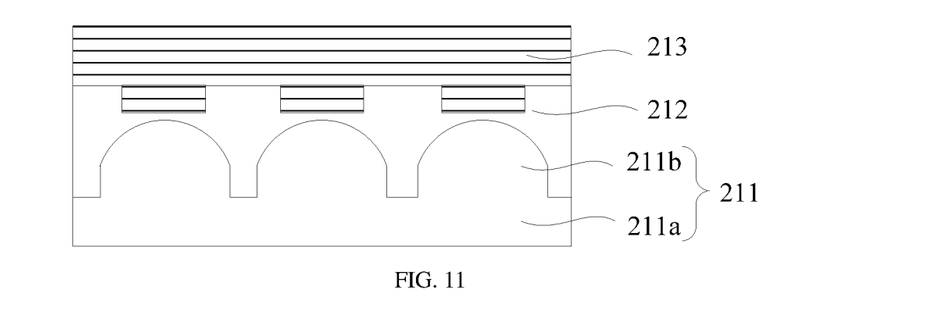
FIG. 11 is a structural diagram of an optical composite film layer of a display panel shown in FIG. 3 in accordance with another embodiment of the present disclosure.
Figure 12:
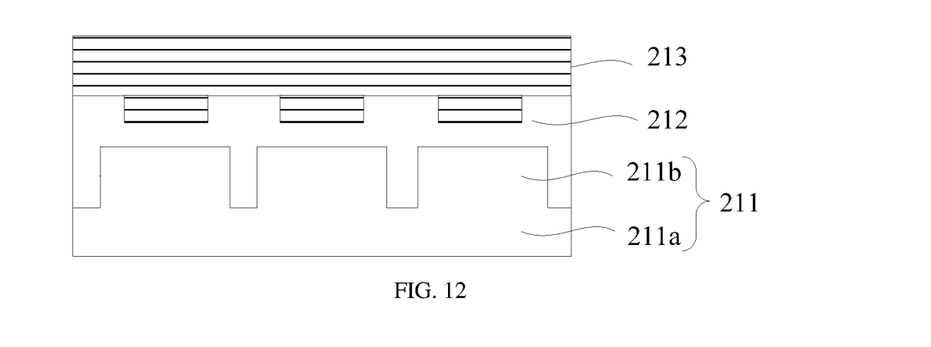
FIG. 12 is a structural diagram of an optical composite film layer of a display panel shown in FIG. 3 in accordance with another embodiment of the present disclosure.

It should be noted that, further referring to FIG. 11 and FIG. 12 together, the first grating film layer 213 is not limited to being laminated on the surface of the second uniaxial optical film layer 212 on the side away from the first uniaxial optical film layer 211; the first grating film layer 213 may be partially embedded in a side of the second uniaxial optical film layer 212 away from the first uniaxial optical film layer 211. Optionally, a portion of the first grating film layer 213 embedded in the second uniaxial optical film layer 212 corresponds to the position of the refractive portion 211b.

Figure 13:
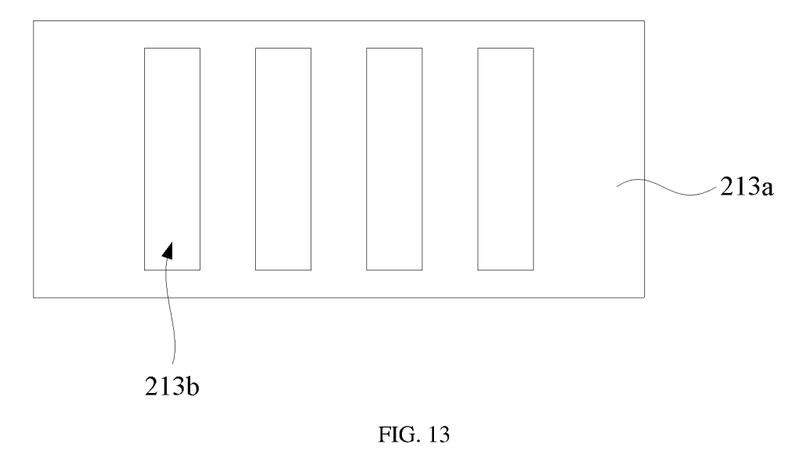
FIG. 13 is a structural diagram of a first grating film layer of an optical composite film layer shown in FIG. 4.

Referring to FIG. 13, specifically, the first grating film layer 213 includes a transparent substrate 213a and a metal layer 213b.

The transparent substrate 213a is one of a glass substrate, a silica gel substrate, a silicon dioxide substrate, a silicon nitride substrate, a polymethyl methacrylate substrate, and a polyethylene terephthalate substrate.

The metal layers 213b are a plurality of strips, and the metal layers 213b are disposed on the transparent substrate 213a. The metal layers 213b are arranged in parallel and spaced apart from each other to provide a grating. Optionally, the metal layers 213b are provided on one side of the transparent substrate 213a. Specifically, the material of the metal layer 213b is one of gold, aluminum, and copper.

Optionally, the width of the metal layer 213b is 50 nm to 150 nm; the thickness of the metal layer 213b is 100 nm to 200 nm; the pitch of the two adjacent metal layers 213b is 100 nm to 200 nm. In particular, the metal layer 213b are rectangular.

The light through the first grating film layer 213 may be divided into electromagnetic wave vibrations perpendicular to the metal layer 213b and electromagnetic waves parallel to the metal layer 213b. The first grating film layer 213 absorbs or reflects an electromagnetic wave component whose electromagnetic wave vibration component is parallel to the extending direction of the metal layer 213b. Only the electromagnetic wave component of which electromagnetic wave vibration component is perpendicular to the extending direction of the metal layer 213b penetrates, and the same effect as the polarizing plate is obtained only by polarized light perpendicular to a stretching direction of polarized photons.

The working principle of the optical composite film layer 210 is as follows.

Light consists of light of horizontal polarization (direction of electric field vibration is 0° or 180°) and light of vertical polarization (direction of electric field vibration is 90° or 270°); and the first grating film layer 213 has a function of absorbing and penetrating polarized light. When the metal layer of the first grating film layer 213 is arranged in a direction parallel to 90° or 270°, the extending direction of the metal layer of the first grating film layer 213 is parallel to the direction of 0° or 180°. It is expected that vertically polarized light may pass through the first grating film layer 213, the equivalent refractive index of the vertically polarized light passing through the first uniaxial optical film layer 211 is $ne_1$, and the equivalent refractive index of the vertically polarized light passing through the second uniaxial optical film layer 212 is $no_2$. Because of the refractive index difference ($ne_1$ is greater than $no_2$) between the first uniaxial optical film layer 211 and the second uniaxial optical film layer 212, the vertically polarized light is refracted from the first uniaxial optical film layer 211 (light-dense medium) toward the second uniaxial optical film layer 212 (light-repellent medium), so that the front view angle optical energy is distributed to the large view angle.

When an arrangement direction for the metal layer of the first grating film layer 213 is parallel to the direction of 0° or 180°, the extending direction of the metal layer of the first grating film layer 213 is parallel to the direction of 90° or 270°. It is expected that the horizontally polarized light may pass through the first grating film layer 213, the equivalent refractive index of the horizontally polarized light passing through the first uniaxial optical film layer 211 is $ne_1$, and the equivalent refractive index of the vertically polarized light passing through the second uniaxial optical film layer 212 is $no_2$. Because of the refractive index difference ($ne_1$ is greater than $no_2$) between the first uniaxial optical film layer 211 and the second uniaxial optical film layer 212, the horizontally polarized light is refracted from the first uniaxial optical film layer 211 (light-dense medium) toward the second uniaxial optical film layer 212 (light-repellent medium), so that the front view angle optical energy is distributed to the large view angle. Therefore, the optical composite film layer 210, instead of the polarizing plate, can not only distribute the front view angle light type energy into a large view angle and improve the visual character polarization, but also can change natural light into polarized light.

The first glass film layer 220 is laminated on the optical composite film layer 210. Optionally, the first glass film layer 220 is laminated on the first grating film layer 213.

The first indium tin oxide film layer 230 is laminated on a side of the first glass film layer 220 away from the optical composite film layer 210.

The liquid crystal layer 240 is laminated on a side of the first indium tin oxide film layer 230 away from the first glass film layer 220.

The second indium tin oxide film layer 250 is laminated on the side of the liquid crystal layer 240 away from the first indium tin oxide film layer 230.

The second grating film layer 260 is laminated on the side of the second indium tin oxide film layer 250 away from the liquid crystal layer 240. The second grating film layer 260 has substantially the same function and material as the first grating film layer 213, so as to replace the upper polarizing plate and further reduce the thickness of the display panel 200.

The second glass film layer 270 is laminated on a side of the second grating film layer 260 away from the second indium tin oxide film layer 250.

The photoresist layer 280 is laminated between the second grating film layer 260 and the second glass film layer 270.

Figure 14:
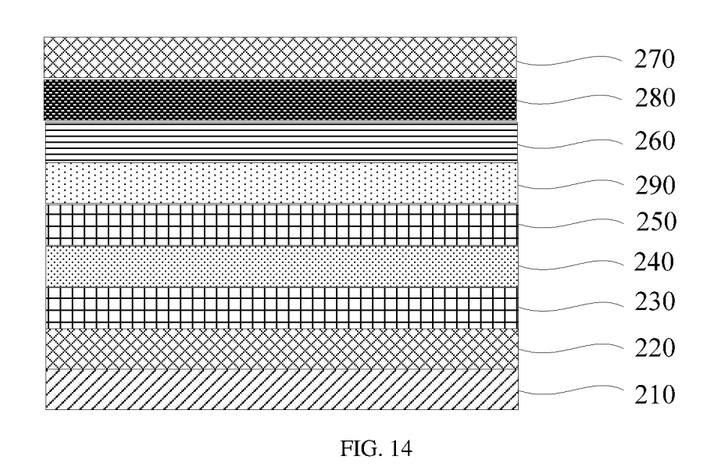
FIG. 14 is a structural diagram of a display panel of a display device shown in FIG. 1 of another embodiment of the present disclosure.
Figure 15:
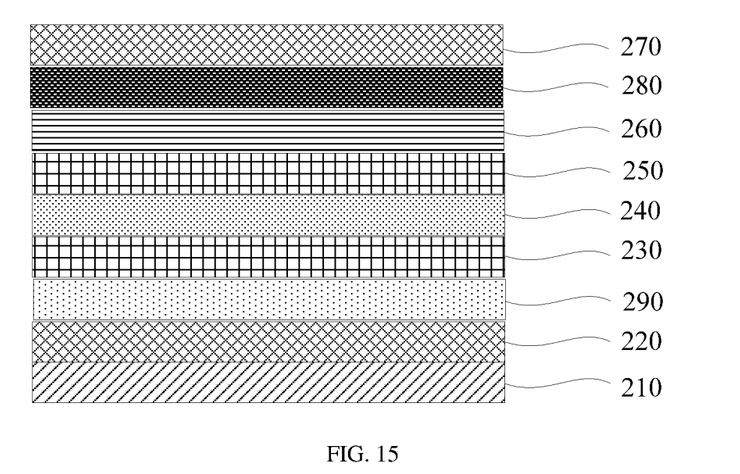
FIG. 15 is a structural diagram of a display panel of a display device shown in FIG. 1 of another embodiment of the present disclosure.

Further referring to FIG. 14 and FIG. 15, optionally, the display panel 200 further includes a compensation film layer 290 laminated between the second indium tin oxide film layer 250 and the second grating film layer 260. Optionally, the compensation film layer 290 is laminated between the first glass film layer 220 and the first indium tin oxide film layer 230. The compensation film layer 290 can replace the optical function of the compensation film in the polarizing plate. Optionally, the compensation film layer 290 has optical anisotropy. Specifically, the material of the compensation film layer 290 is a liquid crystal molecular material of nematic phase. More specifically, the compensation film layer 290 is prepared by a process of liquid crystal molecule coating, ultraviolet (UV) stereo lithography apparatus.

Figure 16:
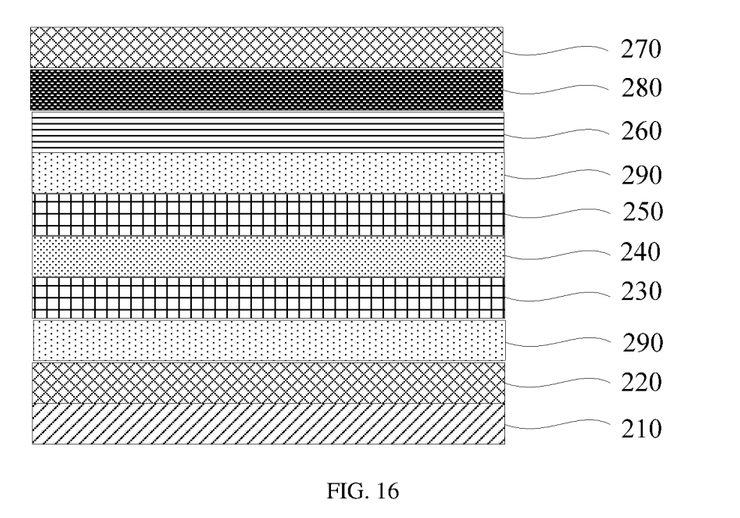
FIG. 16 is a structural diagram of a display panel of a display device shown in FIG. 1 in accordance with another embodiment of the present disclosure.

Further referring to FIG. 16, in an embodiment, there are two compensation film layers 290, one is laminated between the second indium tin oxide film layer 250 and the second grating film layer 260, and the other is laminated between the first glass film layer 220 and the first indium tin oxide film layer 230.

Figure 17:
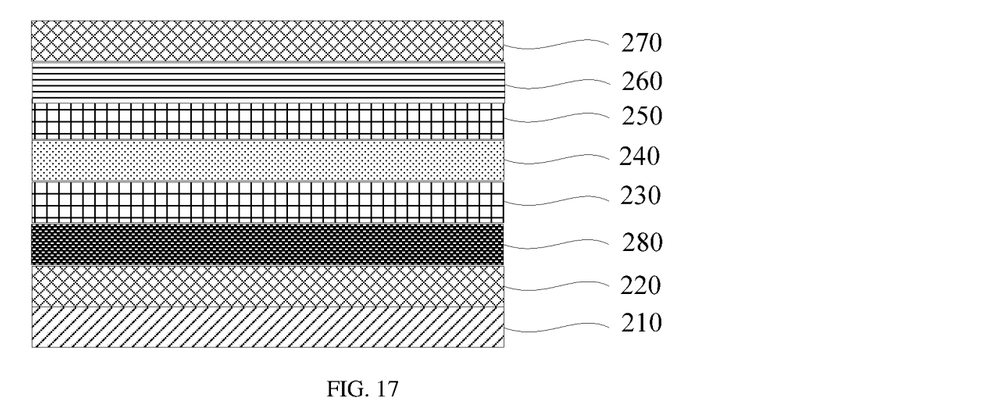
FIG. 17 is a structural diagram of a display panel of a display device shown in FIG. 1 in accordance with another embodiment of the present disclosure.

It should be noted that, further referring to FIG. 17, the display template 200 is not limited to the above structure, and the photoresist layer 280 may be laminated between the first glass film layer 220 and the first indium tin oxide film layer 230.

Figure 18:
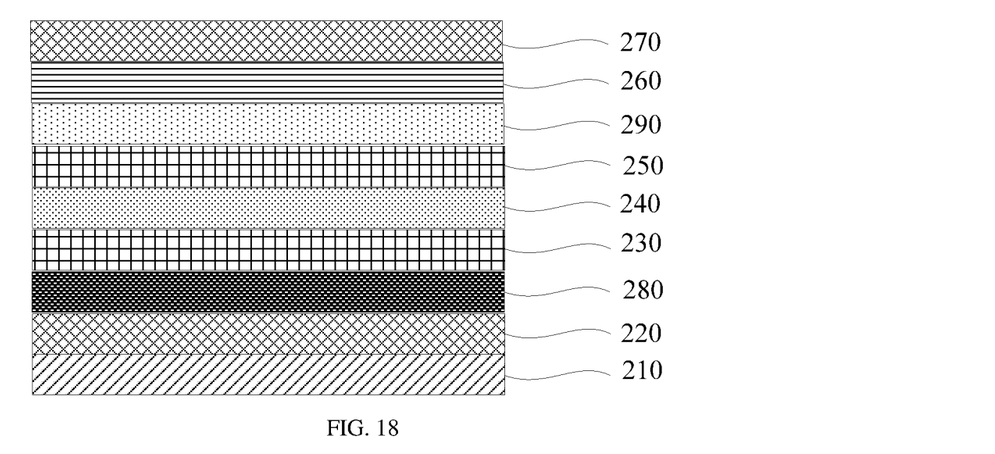
FIG. 18 is a structural diagram of a display panel of a display device shown in FIG. 1 in accordance with another embodiment of the present disclosure.
Figure 19:
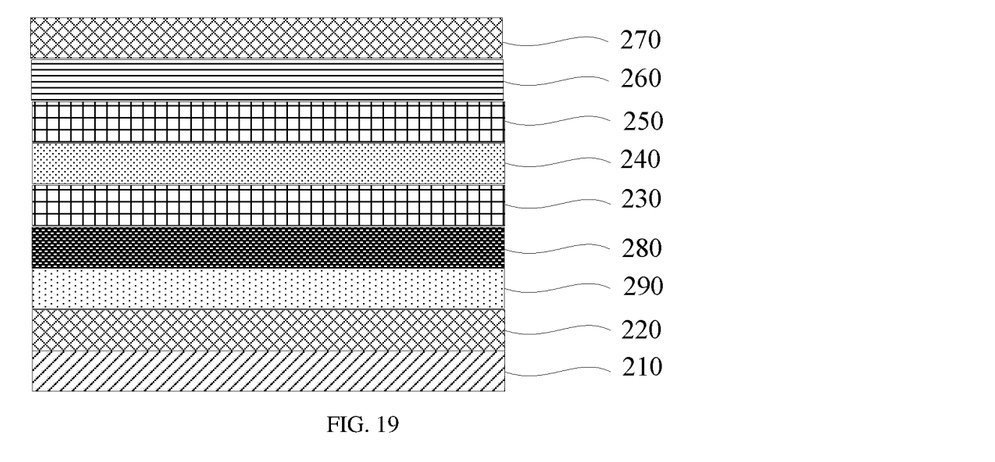
FIG. 19 is a structural diagram of a display panel of a display device shown in FIG. 1 in accordance with another embodiment of the present disclosure.

Further referring to FIG. 18 and FIG. 19, optionally, a compensation film layer 290 is laminated between the second indium tin oxide film layer 250 and the second grating film layer 260. Optionally, the compensation film layer 290 is laminated between the photoresist layer 280 and the first glass film layer 220.

Figure 20:
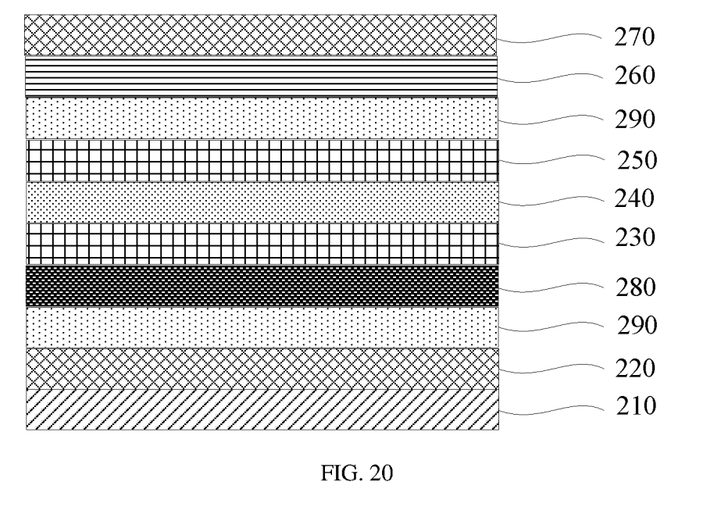
FIG. 20 is a structural diagram of a display panel of a display device shown in FIG. 1 in accordance with another embodiment of the present disclosure.

Further referring to FIG. 20, in an embodiment, there are two compensation film layers 290, one is laminated between the second indium tin oxide film layer 250 and the second grating film layer 260, and the other is laminated between the photoresist layer 280 and the first glass film layer 220.

It should be noted that the display panel 200 is not limited to the above-described laminated structure, and the different film layers may be added with special function materials according to different requirements. For example, by adding materials with other functions in a single function film layer, a multi-functional film layer can be obtained. In addition, the laminating order of the respective film layers in the display panel 200 may be changed according to a desired function, and the film layers with other functions and the like may be added as necessary.

The above-described display device 10 has at least the following advantages.

The first uniaxial optical film layer 211 includes the plate-shaped portion 211a and refractive portions 211b provided on one side of the plate-shaped portion 211a, the refractive portions 211b are one of an arc-shaped column and a quadrangular prism, and the second uniaxial optical film layer 220 is laminated on a side of the plate-shaped portion 211a near the refractive portion 211b; the extraordinary light refractive index of the first uniaxial optical film layer 211 is larger than the ordinary light refractive index of the second uniaxial optical film layer 220, and light is emitted from the first uniaxial optical film layer 211 toward the second uniaxial optical film layer 220. The refraction phenomenon occurs when the light is emitted from the light-dense medium to the light-repellent medium, and the light-type energy of the front view angle is distributed to the large view angle, thereby solving the problem of the color shift of the display panel 200 in the large view; meanwhile, the first grating film layer 230 is laminated on a side of the second uniaxial optical film layer 220 away from the first uniaxial optical film layer 211, the first grating film layer 230, instead of a thick polarizing plate, being capable of turning natural light into polarized light, and thinning the display panel 200. Therefore, the optical composite film layer 210 can not only improve the problem of the color shift of the display panel 200 in large view angle, but also thin the display panel 200.

In the display panel 200, each sub-pixel of RGB does not need to be divide into a main pixel structure and a sub-pixel structure, which eliminates the needs of designing metal traces or TFT elements to drive the sub-pixel avoiding the resulting sacrifice to the light transmissive open area and reduced panel transmittance, while maintaining the display resolution and driving frequency of the display panel 200. Therefore, the optical composite film layer 210 can not only alleviate the visual color shift but also improve the panel transmittance.

The first grating film layer 230 of the display panel 200 replaces the lower polarizing plate, and the second grating film layer 260 replaces the upper polarizing plate, thereby reducing the thickness of the display panel 200.

It should be understood that the applications of the present disclosure are not limited to the above embodiments, and may be modified or modified from the above description by one of ordinary skill in the art. All such modifications and alterations shall fall within the scope of the claims appended hereto.

What is claimed is:

1. An optical composite film layer comprising:
    a first uniaxial optical film layer comprising a plate-shaped portion and a plurality of refractive portions disposed on one side of the plate-shaped portion, the plurality of refractive portions being one of an arc-shaped column and a quadrangular prism; each of the refractive portions has a plurality of side surfaces when the refractive portions are arc-shaped columns, one of the side surfaces being an arc-shaped convex surface, and the side surface of the refractive portion away from the arc-shaped convex surface being in contact with the plate-shaped portion; when the refractive portions are the quadrangular prisms, one side surface of each of the refractive portion is in contact with the plate-shaped portion;
    a second uniaxial optical film layer laminated on a side of the plate-shaped portion near the refractive portion, the refractive portions being accommodated in the second uniaxial optical film layer, an extraordinary light refractive index of the first uniaxial optical film layer is greater than an ordinary optical refractive index of the second uniaxial optical film layer; and
    a first grating film layer disposed on a side of the second uniaxial optical film layer away from the first uniaxial optical film layer;
    wherein a material of the first uniaxial optical film layer is a liquid crystal molecular material of nematic phase.

2. The optical composite film layer according to claim 1, wherein the first uniaxial optical film layer has an extraordinary light refractive index of 1.0 to 2.5.

3. The optical composite film layer according to claim 1, wherein the second uniaxial optical film layer has an ordinary light refractive index of 1.0 to 2.5.

4. The optical composite film layer according to claim 1, wherein a difference between the extraordinary light refractive index of the first uniaxial optical film layer and the ordinary optical refractive index of the second uniaxial optical film layer is 0.01 to 2.

5. The optical composite film layer according to claim 1, wherein the plurality of refractive portions are arc-shaped columns, the refractive portions are arranged along a straight line, extending directions of each of the refractive portions are parallel, and two adjacent refractive portions are in contact or spaced apart.

6. The optical composite film layer according to claim 5, wherein the arc-shaped convex surface is a curved surface disposed with a circular arc line moving along the extending direction of the refractive portion.

7. The optical composite film layer according to claim 1, wherein the refractive portions are arc-faced columns, the refractive portions are arranged in a two-dimensional matrix, and two adjacent refractive portions are spaced apart.

8. The optical composite film layer according to claim 1, wherein the refractive portions are quadrangular prisms, the refractive portions are arranged along a straight line, extending directions of each of the refractive portions are parallel, and two adjacent refractive portions are spaced apart.

9. The optical composite film layer according to claim 1, wherein the refractive portions are quadrangular prisms, the refractive portions are arranged in a two-dimensional matrix, and two adjacent refractive portions are spaced apart.

10. The optical composite film layer according to claim 1, wherein the material of the second uniaxial optical film layer is a discotic liquid crystal molecular material.

11. The optical composite film layer according to claim 1, wherein the first grating film layer comprises a transparent substrate and a plurality of strip-shaped metal layers disposed on the transparent substrate, the metal layers being spaced apart and arranged in parallel.

12. The optical composite film layer according to claim 11, wherein a width of the metal layer is from 50 nm to 150 nm, and a thickness of the metal layer is from 100 nm to 200 nm, and a spacing between two adjacent metal layers is 100 nm to 200 nm.

13. A display panel comprising an optical composite film layer, a first glass film layer, a first indium tin oxide film layer, a liquid crystal layer, a second indium tin oxide film layer, a second grating film layer, a second glass film layer and a photoresist layer, wherein the optical composite film layer comprises:
a first uniaxial optical film layer comprising a plate-shaped portion and a plurality of refractive portions disposed on one side of the plate-shaped portion, the plurality of refractive portions being one of an arc-shaped column and a quadrangular prism; each of the refractive portions has a plurality of side surfaces when the refractive portions are arc-shaped columns, one of the side surfaces being an arc-shaped convex surface, and the side surface of the refractive portion away from the arc-shaped convex surface being in contact with the plate-shaped portion; when the refractive portions are the quadrangular prisms, one side surface of each of the refractive portion is in contact with the plate-shaped portion;
a second uniaxial optical film layer laminated on a side of the plate-shaped portion near the refractive portion, the refractive portions being accommodated in the second uniaxial optical film layer, an extraordinary light refractive index of the first uniaxial optical film layer is greater than an ordinary optical refractive index of the second uniaxial optical film layer; and
a first grating film layer disposed on a side of the second uniaxial optical film layer away from the first uniaxial optical film layer;
wherein the first grating film layer of the optical composite film layer and the first glass film layer, the first indium tin oxide film layer, the liquid crystal layer, the second indium tin oxide film layer, the second grating film layer, and the second glass film layer are sequentially laminated, and the photoresist layer is laminated between the second grating film layer and the second glass film layer, or the photoresist layer is laminated between the first glass film layer and the first indium tin oxide film layer.

14. The display panel according to claim 13, wherein the photoresist layer is laminated between the second grating film layer and the second glass film layer; the display panel further comprises a compensation film layer, the compensation film layer being laminated between the second indium tin oxide film layer and the second grating film layer.

15. The display panel according to claim 13, wherein the photoresist layer is laminated between the second grating film layer and the second glass film layer; the display panel further comprises a compensation film layer, the compensation film layer being laminated between the first glass film layer and the first indium tin oxide film layer.

16. The display panel according to claim 13, wherein the photoresist layer is laminated between the second grating film layer and the second glass film layer; the display panel further comprises a compensation film layer, with a number of the compensation film layer being two, one of the two compensation film layers is laminated between the second indium tin oxide film layer and the second grating film layer, and another compensation film layer is laminated between the first glass film layer and the first indium tin oxide film layer.

17. The display panel according to claim 13, wherein the photoresist layer is laminated between the first glass film layer and the first indium tin oxide film layer; the display panel further comprises a compensation film layer, and the compensation film layer is laminated between the second indium tin oxide film layer and the second grating film layer; or, the compensation film layer is laminated between the photoresist layer and the first glass film layer.

18. The display panel according to claim 17, wherein a number of the compensation film layer is two, one of the two compensation film layers being laminated between the second indium tin oxide film layer and the second grating film layer, another compensation film layer being laminated between the photoresist layer and the first glass film layer.

19. A display device comprising a backlight and the display panel according to claim 13, the backlight being located on one side of the display panel.

20. An optical composite film layer comprising:
a first uniaxial optical film layer comprising a plate-shaped portion and a plurality of refractive portions disposed on one side of the plate-shaped portion, the plurality of refractive portions being one of an arc-shaped column and a quadrangular prism; each of the refractive portions has a plurality of side surfaces when the refractive portions are arc-shaped columns, one of the side surfaces being an arc-shaped convex surface, and the side surface of the refractive portion away from the arc-shaped convex surface being in contact with the plate-shaped portion; when the refractive portions are the quadrangular prisms, one side surface of each of the refractive portion is in contact with the plate-shaped portion;

a second uniaxial optical film layer laminated on a side of the plate-shaped portion near the refractive portion, the refractive portions being accommodated in the second uniaxial optical film layer, an extraordinary light refractive index of the first uniaxial optical film layer is greater than an ordinary optical refractive index of the second uniaxial optical film layer; and a first grating film layer disposed on a side of the second uniaxial optical film layer away from the first uniaxial optical film layer;

wherein the material of the second uniaxial optical film layer is a discotic liquid crystal molecular material.

* * * * *